R. J. STEPHENSON.
BATTERY BOX.
APPLICATION FILED JUNE 8, 1914.

1,186,859.  Patented June 13, 1916.

UNITED STATES PATENT OFFICE.

ROBERT J. STEPHENSON, OF AUBURN, NEW YORK, ASSIGNOR TO THE STEPHENSON SUPPLY COMPANY INC., OF AUBURN, NEW YORK, A CORPORATION OF NEW YORK.

BATTERY-BOX.

1,186,859.  Specification of Letters Patent.  Patented June 13, 1916.

Application filed June 8, 1914. Serial No. 843,691.

*To all whom it may concern:*

Be it known that I, ROBERT J. STEPHENSON, a citizen of the United States, and a resident of Auburn, in the county of Cayuga and State of New York, have invented a certain new and useful Battery-Box, of which the following is a specification.

This invention relates to battery boxes for holding the dry cells used in motor boats and motor vehicles to produce the ignition spark, and it has for its object a battery box having an individual waterproof and insulated compartment for each of the battery cells in which the cell can be received without removing the carton.

The invention consists in the novel features of construction hereinafter set forth and claimed.

In describing this invention, reference is had to the accompanying drawings, in which like characters designate corresponding parts in all the views.

Figure 1:
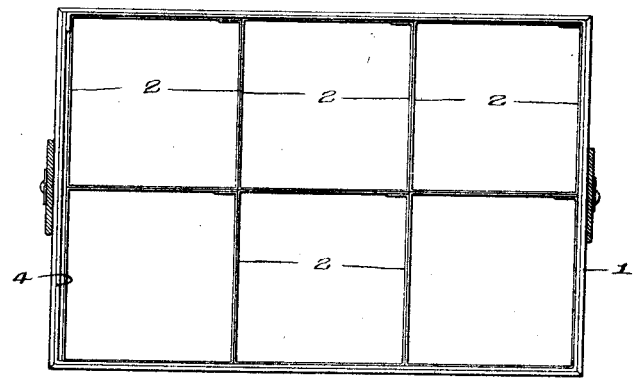
Figure 2:
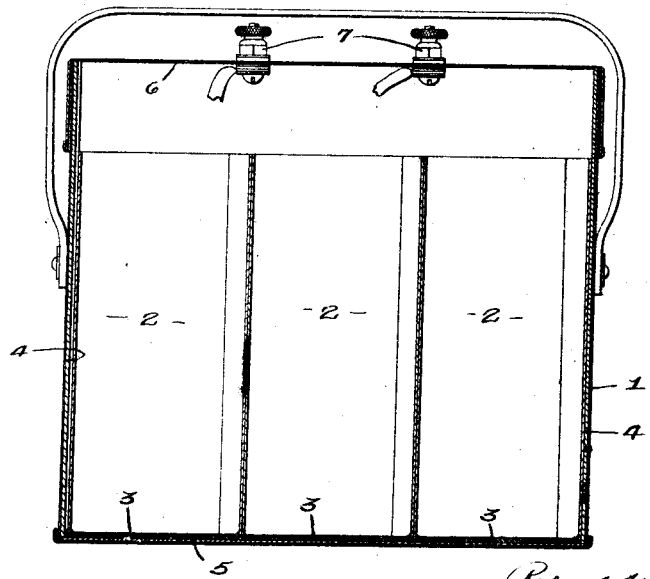

Figure 1 is a plan of my battery box, the cover being removed and the handle being shown as broken away. Fig. 2 is a vertical section through the battery box.

This battery box comprises a suitable container, and a plurality of individual waterproof and insulated compartments fitted within the container for receiving the dry battery cells.

1 is the container which may be of any suitable form, size or construction, the same being preferably formed of metal.

2 are the individual cells or compartments, each consisting of side walls which engage the side walls of the contiguous compartments or the side walls of the container.

As here shown, the compartments 2 are square tubes and all the compartments fit snugly within the container 1. These compartments are formed of an insulating and waterproof material and are preferably formed of card-board saturated with, or having a coating of, an insulating or waterproof material as a mixture or compound of paraffin and beeswax. All the compartments 2 have their lower ends embedded in a waterproof and insulating compound, which is poured in the bottom of the container forming a layer 3, and before the compound sets, the lower ends of the compartments 2 are embedded therein.

When a metal box is used, the same is lined with a card-board lining 4 and bottom 5, which are waterproof and insulating, and the material 3 is poured on the lining 5 on the bottom of the container. However, if the container is formed of cardboard or any other material which can be insulated and waterproofed, it is unnecessary to provide a lining.

6 is a cover for the box, the same being provided with suitable binding devices 7 to which the wires are attached, which wires are connected to the terminals of the batteries. In the making of this battery box, the bottom lining 5 and side lining 4 are inserted in the sheet metal container and waterproof compartments or tubes 2 are fitted within the same, these compartments being lifted off the bottom so that there is a space between the lower edges thereof and the bottom. The material 3 is then poured in a fluid condition into the container so that it flows under the lower edges of the compartments 2 and before such material hardens, the compartments are pressed downwardly so that their lower edges are embedded in the layer 3. Hence, the compartments 2 are waterproof and insulated from each other so that it is impossible for one dry cell to short-circuit with another. This advantage is further increased by the fact that each compartment is composed of four walls individual to such compartment.

Owing to the compartments, the batteries cannot shuffle around in the box, and the liability of the same becoming damaged is avoided.

What I claim is:

A battery box comprising a container, a plurality of battery compartments fitted within the container, each compartment including a tube, the sides of which abut against the sides of the contiguous compartments or against the inner side walls of the container, and the container being provided on its bottom with a layer of waterproof and insulating material in which the lower edges of the tubes are embedded, substantially as and for the purpose described.

5 In testimony whereof, I have hereunto signed my name in the presence of two attesting witnesses, at Auburn, in the county of Cayuga, in the State of New York, this 23rd day of May, 1914.

ROBT. J. STEPHENSON.

Witnesses:
  DAVID M. OSBORNE,
  H. P. WETHERBY.